(No Model.)
F. CURTIUS-BROCKHOFF.
APPARATUS FOR THE MANUFACTURE OF ULTRAMARINE.
No. 454,856. Patented June 30, 1891.
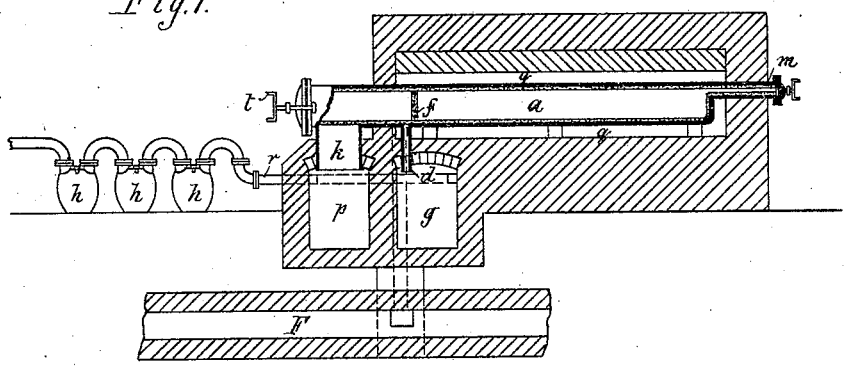
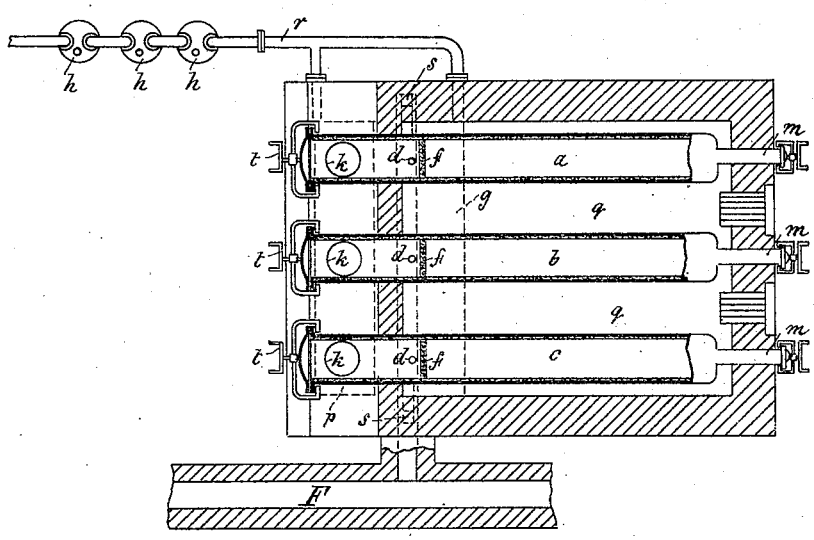

United States Patent Office.

FRIEDRICH CURTIUS-BROCKHOFF, OF DUISBURG, GERMANY.

APPARATUS FOR THE MANUFACTURE OF ULTRAMARINE.

SPECIFICATION forming part of Letters Patent No. 454,856, dated June 30, 1891.

Application filed December 16, 1890. Serial No. 374,908. (No model.)

*To all whom it may concern:*

Be it known that I, FRIEDRICH CURTIUS-BROCKHOFF, chemist and manufacturer, a subject of the King of Prussia and German Emperor, residing at Duisburg, in the Kingdom of Prussia and German Empire, have invented certain new and useful Improvements in Apparatus for the Manufacture of Ultramarine; and I do hereby declare the following to be a full, clear, and exact description of the invention, such as will enable others skilled in the art to which it appertains to make and use the same.

This invention relates to the manufacture of ultramarine; and it consists in apparatus hereinafter fully described and claimed.

In the drawings, Figure 1 is a longitudinal section through the apparatus, and Fig. 2 is a sectional plan view of the same.

The raw material is roasted in a retort. Three similar retorts $a$ $b$ $c$ are shown in the drawings, and are set in a chamber $q$ and heated by fire in any convenient manner. The rear end of each retort is provided with a neck $m$ at its upper part, which projects through the end wall of the chamber and is provided with an air-tight cover of approved construction. The front end of each retort projects through the front wall of the chamber, and is provided with an air-tight cover $t$.

Each retort is made of cast-iron or other metal impervious to gas, and is coated on the inside with cement to prevent the metal from being destroyed by the sulphur evolved from the heated material inside the retort. A pipe $k$ is located at the front end of each retort, and a tube $d$ is located behind the pipe, both pipe and tube being on the under side of the retort.

The materials are introduced into each retort through the neck $m$, and the front end of the retort is stopped up during the roasting by a slab $f$ of porous cement. The cement lining is also extended over the upper ends of the pipe $k$ and tube $d$.

A gas-chamber $g$ is formed transversely in the brick-work under the retorts, and is connected by the pipe $r$ to the vessels $h$, in which the absorption of the gas is effected by any liquid or chemical with which the gas will combine chemically.

A cooling and oxidizing chamber $p$ is provided under the pipes $k$, and has the pipe $r$, also connected to it.

F is the main flue, connected to the chamber $q$ by the flues $s$, for removing the products of combustion.

On heating the materials in the retorts the gaseous, volatile, and liquid products pass through the porous slabs $f$ and the cement coverings of the tubes $d$, and the gas also passes through the cement coverings of the pipes $k$. The liquid products and sulphur are retained in the chamber $g$, and the gas passes on into the vessels $h$. The heating or roasting is continued without admitting any air into the retorts until the reaction is complete. The green crude ultramarine is oxidized subsequently by opening the covers at the ends of the retorts, removing the slabs $f$, and raking the material into the chamber $p$, after first removing the cement which covers the tops of the pipes $k$. The cement lining over the pipes $k$ may be made in the form of a removable slab, or it may be broken away to let the ultramarine pass into the pipes and replaced before the retorts are closed upon the new charge. The air oxidizes the crude ultramarine and changes its color from green to blue. The retorts are recharged with raw material directly after the ultramarine has been raked into the chamber $p$, so that the process is carried on continuously.

I do not confine myself to any particular cement for lining the retorts, as any approved composition that will withstand the chemical action of the evolved gases may be employed.

What I claim is—

The apparatus for making ultramarine, consisting of a metal retort lined with cement and provided with a dumping-pipe at one end and a tube for gas and liquid behind it, a slab of porous material in the retort behind the said tube for permitting the impurities to pass out of the retort, and an inclosing heating-chamber, substantially as and for the purpose set forth.

In testimony whereof I affix my signature in presence of two witnesses.

FRIEDR. CURTIUS-BROCKHOFF.

Witnesses:
D. J. PARTELLO,
C. SCHMIEDING.